Patented May 19, 1925.

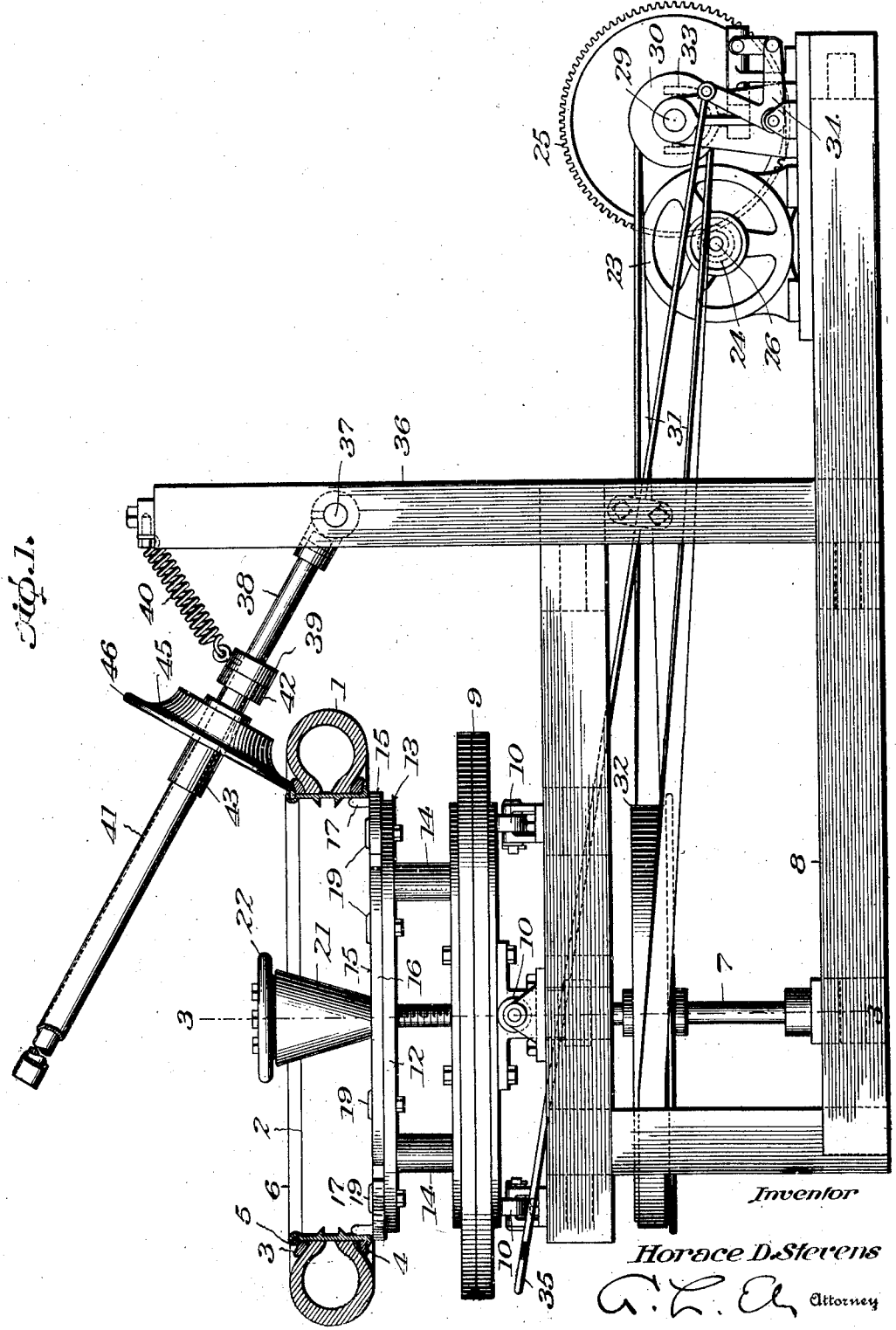

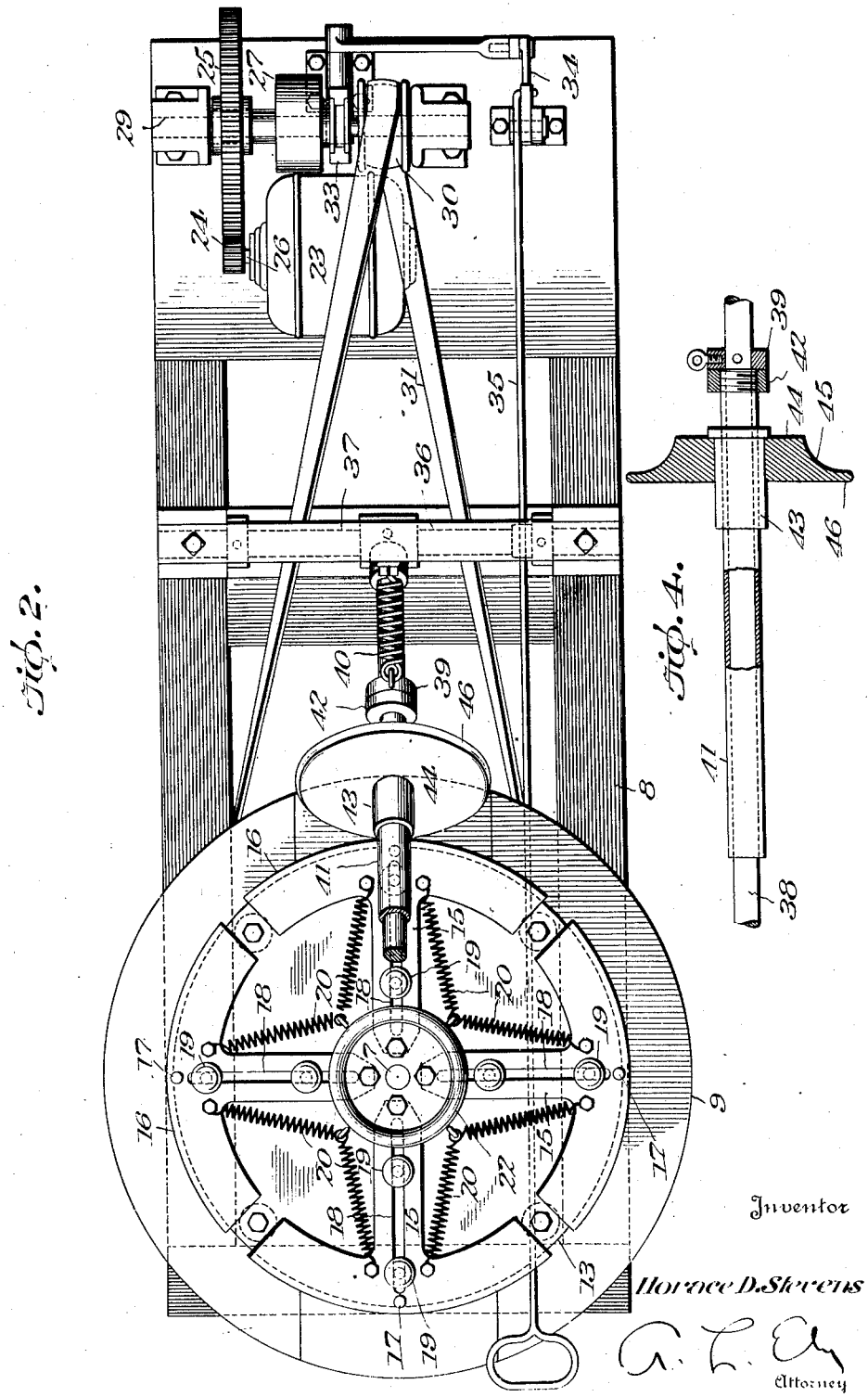

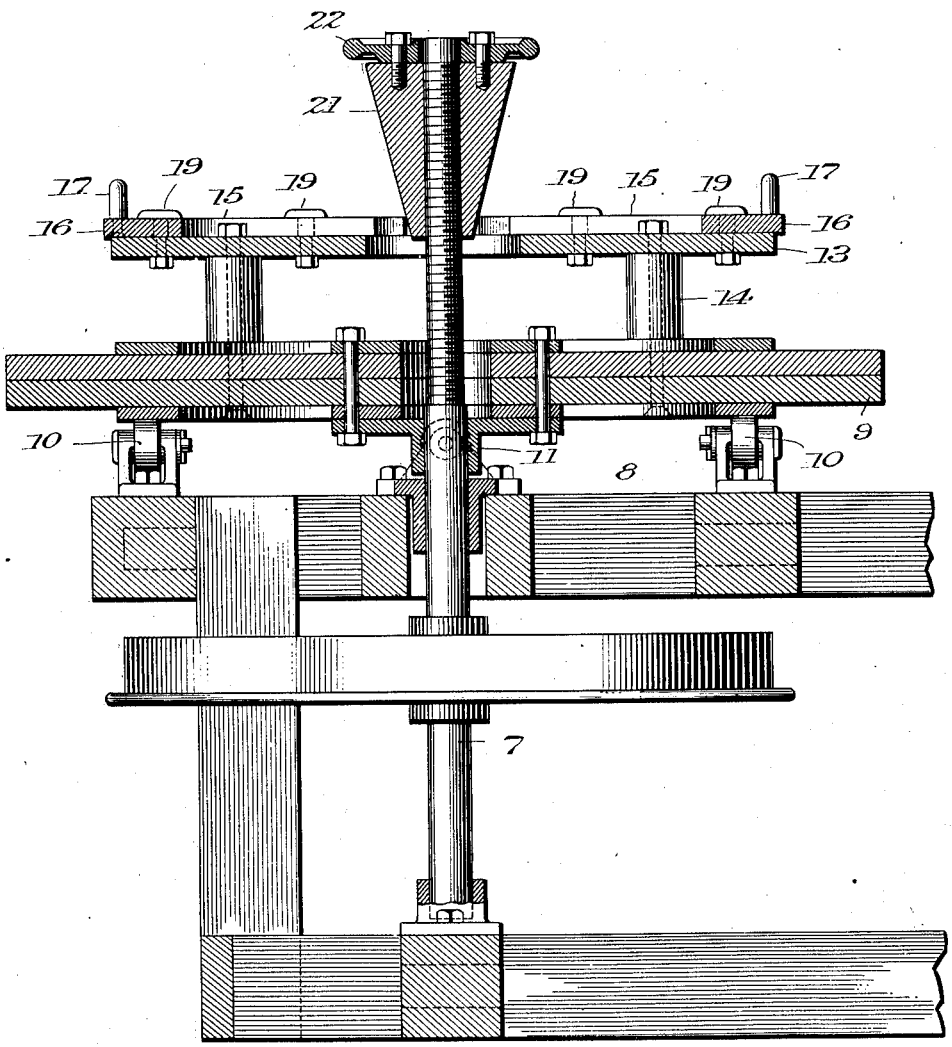

1,538,875

UNITED STATES PATENT OFFICE.

HORACE D. STEVENS, OF AKRON, OHIO, ASSIGNOR TO THE FIRESTONE TIRE & RUBBER COMPANY, OF AKRON, OHIO, A CORPORATION OF OHIO.

TIRE MOUNTING AND DEMOUNTING APPARATUS.

Application filed February 5, 1923. Serial No. 616,920.

*To all whom it may concern:*

Be it known that I, HORACE D. STEVENS, a citizen of the United States, residing at Akron, in the county of Summit, State of Ohio, have invented certain new and useful Improvements in Tire Mounting and Demounting Apparatus, of which the following is a specification.

My invention relates to improvements in apparatus for use in mounting or demounting pneumatic tires from rims, and it seeks to provide a simply constructed and easily operable apparatus that is especially adapted for accomplishing either of the above described results, and thus relieving the operator of the considerable manual labor formerly required for this work. The apparatus shown is particularly adapted for use in garages or service stations.

Another purpose of my invention is to provide a form of apparatus that is adapted for removing a tire from its rim or mounting it thereon, through the use of pressure forces alone so that neither the tire nor the rim is marred or otherwise injured as when blows are resorted to in attempting these operations.

Still another purpose of my invention is to provide an apparatus which may be used to press the bead portions or side-walls of a tire laterally of a rim while the tire and rim are being rotated so that the retaining detachable flanges may be removed from the rim and the tire forced off the rim gradually and evenly to prevent it from binding thereon.

My apparatus is also designed for use in pressing the tire retaining detachable flanges laterally of the rim to facilitate their removal, as will presently appear.

Specifically, my invention is directed toward providing a practical form of rotary chuck for supporting rims of different sizes and a manually operable presser medium which may be adjusted radially of the rim to position it with respect to the tire and rim so that the bead portion of a tire may be forced laterally of the rim or a similar operation may be effected upon the removable retaining detachable flanges with which certain classes of rims are provided.

With these and other objects in view, the invention resides in the particular arrangement and combination of instrumentalities disclosed in their preferred assembly and construction in the following description and the accompanying drawings and particularly pointed out in the claims appended hereto.

In the drawings:

Figure 1 is a side elevational view of a preferred form of apparatus constructed in accordance with the principles of my invention;

Figure 2 is a plan view;

Figure 3 is a transverse sectional view, taken on the line 3—3 of Figure 1 and drawn on an enlarged scale; and Figure 4 is a detail view of a presser medium forming a part of my invention.

In the drawings, and for the purpose of illustration only, I have shown my invention in position to remove a tire 1 from a standard form of rim 2 that embodies tire retaining detachable flanges 3 and 4 respectively, located upon opposite edges of the rim, both of the detachable flanges being movable across the face of the rim. In this form of rim, one of the detachable flanges is locked upon the rim 2 by a removable split locking ring 5 that seats in an edge gutter 6 upon the rim. My invention is, however, adapted for use with other types of rims than that above described.

The rim 2 is supported and rotated about a vertical drive shaft 7 which is suitably journaled at the front end of a base structure 8 and projects thereabove for a purpose presently apparent. The base 8 may be of any suitably construction, but preferably comprises a rectangular open frame of the character shown in the drawings. Upon the base 8 an annular horizontal turn-table 9 is mounted to revolve concentrically about the projecting end of the shaft 7. The turn-table 9 is supported upon suitably arranged roller bearings 10 and carries an axially arranged sleeve 11 upon its inner face. The sleeve 11 receives the projecting end of the shaft 7 and holds the table and shaft in concentric relation. An elevated chuck or tire supporting member 12 is mounted upon the turn-table 9 to revolve therewith. The chuck 12 comprises an annular platform 13 suitably supported upon the table 9 by upstanding lugs 14 to revolve concentrically of the shaft 7. The platform 13 supports a series, preferably four, of radially disposed arms 15, each of which is provided at its outer end with a segmental portion 16 concentric to the shaft 7. Each segmental portion 16 is provided near its center and adjacent its outer edge with an upstanding lug 17. The arms 15 are designed to receive the rim 2 upon the outer edge of their respective portions 16 with the lugs 17 bearing against the inner face of the rim. Each arm 15 is slotted radially of the platform 13, as shown at 18, and is secured to the platform by suitably arranged bolts 19 so that the arms may be adjusted radially to clamp the rim in concentric position relative to the shaft 7. Normally the arms 15 are held in retracted position by suitably arranged retractile springs 20. The projecting end of the shaft 7 is threaded to receive a conical spreader member 21 adapted to be screwed down upon the shaft to engage the inner ends of the arms 15 and force them simultaneously outwardly of the shaft 7. A suitable hand wheel 22 is provided upon the spreader member 21 so that it may be easily turned upon the shaft 7. By screwing the member 21 against the inner ends of the arms 15 when a rim is mounted upon the arms, the lugs 17 are clamped against the inner face of the rim 2 and a driving connection is established between the chuck 12, turn-table 9 and shaft 7. By means of the chuck construction above described, different sizes of rims may be quickly locked and held in concentric position upon the turn-table 9, as will be obvious without further explanation.

At the opposite end of the base 8, a suitable motor 23 is mounted. Reduction gears 24 and 25 connect the motor shaft 26 through any desired form of clutch 27 with a pulley shaft 29. The shaft 29 carries a pulley 30 which is connected by a belt 31 with a relatively larger pulley 32 fixed upon the lower end of the drive shaft 7. The clutch 27 is adapted for operation through a rocking yoke lever 33 that is connected to a pivoted bell crank lever 34. An operating lever 35 extends from the lever 34 to a point adjacent the turn-table 9 so that the clutch 27 may be operated from the front of the apparatus.

Intermediate the ends of the base, a vertical frame 36 is arranged to support a horizontal shaft 37. A lever 38 is pivoted at its rear end upon the shaft 37 to project over the chuck 12 in a radial position with respect thereto and to be swung in a vertical plane. Adjacent its pivoted end the lever 38 is provided with a fixed collar 39 to which one end of a coil spring 40 is attached. The other end of the spring is attached to the frame 36 so that the lever 38 is yieldingly held in a raised position. An elongated sliding sleeve 41 is mounted upon the lever 38 in front of the collar 39. The rear end of the sleeve 41 is provided with a collar 42 adapted to abut the collar 39 to limit movement of the sleeve 41 in one direction. A second shorter sleeve 43 is rotatably mounted upon the sleeve 41 to slide longitudinally thereof. Sleeve 43 has a presser roller 44 fixed thereon to also slide longitudinally of the sleeve 41. Normally the sleeve 43 abuts the collar 42 upon the sleeve 41. The roller 44 is constructed with a concave inclined face 45 so as to conform to the transverse curved side-wall of a tire and a rounded edge flange 46 for engaging the beads of the tire or the retaining detachable flanges 3 and 4. By moving the sleeve 41 upon the lever 38 the sleeve 43 and roller 44 may be adjusted radially of the tire 1 and rim 2 to properly position the roller 44 either against the tire or against the retaining detachable flanges 3 and 4.

When it is desired to remove a tire from the type of rim illustrated, the rim is first positioned upon the chuck 12 with the detachable flange 3 uppermost. The operator now grasps the outer end of the sleeve 41 and swings it together with its associated parts toward the chuck 12. He then adjusts the sleeve 41 upon the lever 38 to position the flange 46 of the roller 44 upon the retaining detachable flange 3. The chuck 12 is now rotated either continuously or intermittently, or, if desired, the chuck may be rotated first. By pressing downwardly upon the sleeve 41 and lever 38, the detachable flange is disengaged from the locking ring 5 so that the latter may be easily removed. The tire 1 and rim 2 are now preferably reversed upon the chuck with the detachable flange 4 uppermost and the roller 44 is positioned against the detachable flange 4. By forcing the roller 44 downwardly against the detachable flange 4 while the chuck is rotating, the tire and detachable flanges 3 and 4 may be forced from the rim without either of them binding upon the rim and becoming injured or marred, the tire passing off the rim and onto the table 9. If desired, of course the detachable flange 3 may be first removed before the rim and tire are reversed. During the above described operation, it will be noted that the roller 44 and sleeve 41 may be moved upon the lever 38 as they move downwardly so that the roller 44 will not engage the rim 2.

In mounting a tire upon a rim, the concave face of the roller 44 is engaged with the side-wall of the tire preferably with the flange 46 bearing against the base of the beads. By pushing upon the sleeve 41 and at the same time moving it downwardly the beads of the tire may be forced over the rim while the latter is rotating and into proper position thereon. Roller 44 may also be utilized in positioning the detachable flanges 3 and 4 as will be obvious without further explanation.

The foregoing constitutes a detailed description of one form of my invention, but it is to be understood that the present disclosure is illustrative in character and should not be construed as limiting the invention to the precise arrangement of parts and details of construction herein shown and described.

What I claim is:

1. In a tire mounting and demounting apparatus, a rotatable support for a tire carrying rim, movable clamping means for the rim, a power shaft, and a single operative device for moving the clamping means and simultaneously connecting the support for driving relation to the power shaft.

2. In a tire mounting and demounting apparatus in combination, a base, a drive shaft on the base, rim supporting means arranged to rotate concentrically of the shaft and embodying movable rim engaging devices, and means for moving the devices into engaging position and clutching them to the shaft.

3. In a tire mounting and demounting apparatus in combination, a base, a drive shaft, a series of movable rim supporting members grouped about the shaft to be clutched thereto, and means for moving the members and clutching them to the shaft.

4. Apparatus for removing a tire from a rim or positioning it thereon comprising, a base, a turn-table upon the base, a chuck upon the turn-table embodying a series of movable rim engaging members, and means adapted to rotate the chuck and turn-table through movement of the members into rim engaging position.

5. In a tire mounting and demounting apparatus in combination, a base, a drive shaft upon the base, a turn-able, and a chuck upon the turn-table embodying movable members adapted to be clutched to the shaft.

6. In a tire mounting and demounting apparatus in combination, a base, a vertical drive shaft projecting above the base, a horizontal turn-table about the shaft, a series of members upon the table adapted to be moved into engagement with the rim and to be clutched to said shaft, and means for moving the members and clutching them to the shaft.

HORACE D. STEVENS.